2,715,622
ANTHELMINTIC DYE SALTS

Koert Gerzon and Donald A. Zuck, Indianapolis, Ind., assignors to Eli Lilly and Company, Indianapolis, Ind., a corporation of Indiana No Drawing. Application October 29, 1953,
Serial No. 389,141

5 Claims. (Cl. 260—240)

This invention relates to anthelmintic agents and more particularly to certain salts of anthelmintic dyes.

The use of methylrosaniline chloride, commonly known as Gentian Violet, in the treatment of human parasitic infestations is well known, and that dye has heretofore proved to be one of the most effective agents available for this purpose. It is also known that [6-dimethylamino-1-methylquinoline-(2)][2,5-dimethyl-1-phenylpyrrole-(3)]-dimethinecyanine chloride, hereinafter, for convenience, designated as Cyanine Dye No. 715, is effective in the treatment of various helminthic infestations in dogs. However, both of these dyes have definite toxicity and it is necessary to undertake their administration under close supervision to prevent the manifestation of untoward side effects. Furthermore, the dyes require careful handling since they more or less permanently stain skin, cloth, or other susceptible objects with which they come into contact. Additionally, they have a disagreeable taste, and are irritating to the mucous membranes of the gastrointestinal tract, and consequently when administered in therapeutic amounts often cause nausea, vomiting and the like, which necessitates a reduction in dosage or even a cessation of treatment.

We have found that salts of methylrosaniline chloride and Cyanine Dye No. 715 formed with members of the group consisting of phenolphthalein and phenolphthalin possess certain marked advantages as anthelmintic agents. Thus, the new dye salts are more active as anthelmintics than the dyes themselves, so that the doses of dye salts can be reduced, thereby avoiding side effects. They are substantially tasteless, and because they are substantially insoluble in water, the dye salts of our invention do not permanently stain the skin or clothing. Furthermore, the new phenolphthalein and phenolphthalin dye salts are less toxic and therefore have a more favorable therapeutic ratio than the dyes from which they are derived.

The phenolphthalein which is used in preparing the salts of the invention is the common commercially available phenolphthalein. Phenolphthalin, otherwise known as dihydroxytriphenylmethane-2-carboxylic acid, can be prepared by dehydration of phenolphthalein with zinc dust in boiling alkaline solution.

The pyrrole dimethinecyanine dye herein referred to as Cyanine Dye No. 715 is described in U. S. Patent No. 2,515,912. Methylrosaniline chloride, or Gentian Violet, as is well known, generally consists of a mixture of hexamethyl-, pentamethyl- and tetramethyl-pararosaniline, which is commonly used medicinally without regard to the amounts of the various homologs which are present therein. When only hexamethyl-pararosaniline is present, the dye is called Crystal Violet. Other names under which mixtures of the various tetra-, penta- and hexa-methyl-pararosaniline chlorides are known include Aniline Violet, Methyl Violet, Dahlia Violet, Methyl-aniline Violet and the like. The term methylrosaniline as used herein refers to any of the possible individual methyl-pararosanilines or mixtures thereof.

Broadly speaking, the phenolphthalein and phenolphthalin dye salts can be prepared by mixing stoichiometrically equivalent amounts of the selected dye and an alkali metal salt of phenolphthalein or phenolphthalin in aqueous solution. Because of the low solubility of the resulting dye salts in water, immediate precipitation occurs. The dye salts are then recovered in any suitable manner. After drying, the phenolphthalein- or phenolphthalin- dye salts can be incorporated into pharmaceutical preparations, as, for example, by combining them with an extending medium. Suitable extending media include aqueous vehicles, in which the dye salts are suspended. Alternatively, the dye salts can be mixed with an inert solid diluent and compressed into tablets, or placed in telescoping gelatin capsules.

The following examples illustrate the preparation of the new dye salts.

Example 1

To a solution of 42.5 g. (0.1 mol) of methylrosaniline chloride, N. F. IX, in 500 ml. of water are added with stirring 36.5 g. (0.1 mol) of disodium salt of phenolphthalein dissolved in 500 ml. of water. An immediate precipitate of the phenolphthalein salt of methylrosaniline is formed. The phenolphthalein dye salt is removed by filtration, is washed with successive 250 ml. portions of cold water, and is dried.

The phenolphthalein salt of methylrosaniline is dark brownish green in color, and is insoluble in water and dilute aqueous alkali. The substance is slightly soluble in alcohol and dilute aqueous mineral acid.

Example 2

A solution of 21 g. of [6-dimethylamino-1-methyl-quinoline - (2)][2,5 - dimethyl - 1 - phenylpyrrole - (3)]-dimethinecyanine chloride in 200 ml. of water is added to a solution of 18.2 g. of disodium salt of phenolphthalein in 100 ml. of water, with stirring. An immediate precipitation of the phenolphthalein salt of Cyanine Dye No. 715 occurs. The precipitated salt is removed by filtration, is washed with successive 100 ml. portions of cold water and is dried.

The phenolphthalein salt of [6-dimethylamino-1-methyl-quinoline - (2)][2,5 - dimethyl - 1 - phenylpyrrole - (3)]-dimethinecyanine is dark brown in color and is substantially insoluble in water.

Example 3

To a solution of 21 g. of methylrosaniline chloride, N. F. IX, in 200 ml. of water are added with stirring 18 g. of the disodium salt of phenolphthalin dissolved in about 250 ml. of water. A precipitate consisting of the phenolphthalin salt of methylrosaniline is immediately formed. After the precipitation is completed, the dye salt is removed by filtration, is washed with successive 100 ml. portions of cold water and is dried.

The phenolphthalin salt of methylrosaniline is a dull metallic gray color, is substantially insoluble in water, and is slightly soluble in dilute aqueous mineral acid.

Example 4

The procedure of Example 2 is followed, except that the disodium salt of phenolphthalin is used. The phenolphthalin salt of [6-dimethylamino-1-methylquinoline-(2)][2,5-dimethyl-1-phenylpyrrole-(3)]dimethinecyanine is recovered.

We claim:

1. A salt comprising the reaction product of a member of the group consisting of phenolphthalin and phenolphthalein and a member of the group consisting of methylrosaniline and [6-dimethylamino-1-methylquinoline-(2)]-[2,5-dimethyl-1-phenylpyrrole-(3)]dimethinecyanine.

2. The phenolphthalein salt of methylrosaniline.
3. The phenolphthalin salt of methylrosaniline.
4. The phenolphthalein salt of [6-dimethylamino-1-methylquinoline-(2)][2,5-dimethyl-1-phenylpyrrole-(3)]-dimethinecyanine.
5. The phenolphthalin salt of [6-dimethylamino-1-methylquinoline-(2)][2,5-dimethyl-1-phenylpyrrole-(3)]-dimethinecyanine.

References Cited in the file of this patent

UNITED STATES PATENTS

| | | |
|---|---|---|
| 2,245,530 | Mayfield | June 10, 1941 |
| 2,320,630 | Mayfield | June 1, 1943 |

OTHER REFERENCES

Sollman, "A Manual of Pharmacology" 1948, pp. 184–186.

Peters, J. Pharmacology and Exp. Therapy, February 1949, pp. 212–39.